May 11, 1943. S. GUARNASCHELLI Re. 22,309

COUPLING

Original Filed Aug. 27, 1941

INVENTOR
STEPHEN GUARNASCHELLI

BY Marshall & Hawley.
ATTORNEYS

Reissued May 11, 1943

Re. 22,309

UNITED STATES PATENT OFFICE 22,309

COUPLING

Stephen Guarnaschelli, Mount Vernon, N. Y., assignor to Packless Metal Products Corporation, New York, N. Y., a corporation of New York Original No. 2,301,038, dated November 3, 1942, Serial No. 408,448, August 27, 1941. Application for reissue December 18, 1942, Serial No. 469,463

12 Claims. (Cl. 285—120)

This invention relates to couplings and particularly to swivel couplings.

It is difficult to prevent leakage from swivel couplings, especially where fluid under pressure circulates therethrough.

This invention has for its salient object to provide a multiple seal coupling so constructed and arranged that leakage therefrom will be reduced to a minimum or entirely prevented.

Another object of the invention is to provide a leakproof multiple seal swivel coupling so constructed and arranged that no packing will be necessary to prevent leakage.

Figure 1:
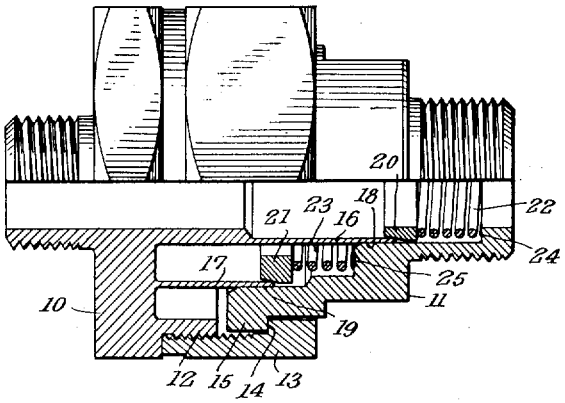
Figure 2:
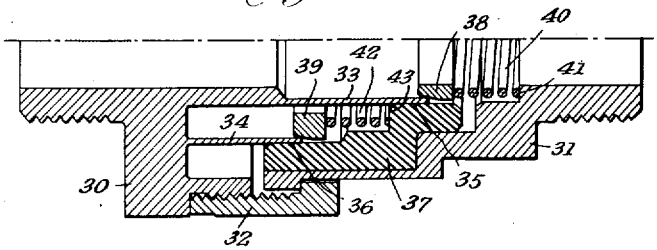

Further objects of the invention will appear from the following specification taken in connection with the drawing which forms a part of this application, and in which Figure 1 is an elevational view, one-half in section, illustrating a multiple seal coupling constructed in accordance with the invention; and Fig. 2 is a sectional elevation of one-half of a modified form of coupling construction embodying the invention.

In the embodiment of the invention illustrated in Fig. 1 the coupling comprises a pair of members 10 and 11 adapted to be connected into a pipe line. The member 10 is provided with a threaded portion 12 engaged by a nut 13 which has an inwardly extending flange or shoulder 14 engageable with an outwardly extending flange 15 of the coupling member 12 and adapted to draw the coupling members together.

The coupling member 10 is provided with a pair of longitudinally extending relatively thin cylindrical sleeves or walls 16 and 17 which are adapted to seat against internal cylindrical surfaces 18 and 19 formed in the member 11. The outside diameters of the sleeves are slightly larger than the inside diameters of the cylindrical surfaces of the walls 16 and 17 and the sleeves are pressed or forced into sealing relation in the surfaces 18 and 19, but are rotatable therein to provide a swivel coupling. Furthermore, the pressure within the coupling is adapted to force the relatively thin walls 16 and 17 into sealing engagement with the surfaces 18 and 19.

In order to facilitate this sealing engagement a pair of collars 20 and 21 are provided, these collars having curved or conical surfaces arranged to enter the outer ends of the walls 16 and 17. The collars are held in position by means of springs 22 and 23 which seat at their outer ends against shoulders 24 and 25 formed in the coupling member 11.

In the embodiment of the invention shown in Fig. 2 there is illustrated a coupling comprising coupling members 30 and 31 corresponding with members 10 and 11 at Fig. 1. These members are held in cooperating relation by means of a nut 32 carried by the coupling member 30 and engaging a flange on the coupling member 31 in the manner above described.

Member 30 is provided as in the other embodiment of the invention, with a pair of relatively thin cylindrical sleeves or walls 33 and 34 which in this instance seat against internal cylindrical surfaces 35 and 36 of an intermediate member 37. The member 37 is carried by the member 31.

The seating of the walls 33 and 34 is facilitated and the seal is insured by collars 38 and 39 which correspond with the collars 20 and 21 in Fig. 1. Spring 40, which engages the collar 38, seats as before against a shoulder 41 on the member 31. Spring 42 which engages the collar 39 seats against a shoulder 43 formed on the intermediate member 37.

The intermediate member 37 is preferably formed of suitable plastic material having lubricating qualities as, for instance, material having embodied therein graphite or other suitable lubricant.

From the foregoing specification it will be evident that the multiple seal structure provides a tight seal for preventing leakage from the coupling while at the same time providing a swivel construction.

Although certain specific embodiments of the invention have been particularly shown and described, it will be understood that the invention is capable of modification and that changes in the cooperating parts may be made without departing from the spirit or scope of the invention as expressed in the following claims.

What I claim is:

1. A coupling connection comprising a pair of coupling members, each member having a plurality of surfaces of revolution overlapping and in sealing engagement with corresponding surfaces of the other member and resiliently actuated means for forcing said interengaging surfaces into close contact with each other.

2. A coupling connection comprising a pair of coupling members, one member having a plurality of longitudinally extending relatively thin cylindrical walls and the other member having cylindrical surfaces dimensioned to receive and to closely engage said walls and resiliently actuated means for forcing said walls into sealing engagement with said surfaces.

3. A coupling connection comprising a pair of coupling members, each member having a plurality of surfaces of revolution and an intermediate member having a plurality of surfaces of revolution overlapping and in sealing engagement with the surfaces of revolution of said pair of coupling members, said intermediate member being formed of self-lubricating material.

4. A coupling connection comprising a pair of coupling members, each member having a plurality of cylindrical surfaces, an intermediate member having a plurality of cylindrical surfaces overlapping and in sealing engagement with the surfaces of said pair of members and resiliently actuated means for forcing said interengaging surfaces into close engagement with each other.

5. A coupling connection comprising a member having a plurality of longitudinally extending, relatively thin cylindrical walls, an intermediate member having a plurality of inner cylindrical surfaces overlapping and engaging the outer surfaces of said cylindrical walls and a third member having a plurality of cylindrical surfaces engaging outer surfaces of the intermediate member.

6. A coupling connection comprising a member having a plurality of longitudinally extending, relatively thin cylindrical walls, an intermediate member having a plurality of inner cylindrical surfaces overlapping and engaging the outer surfaces of said cylindrical walls and a third member having a plurality of cylindrical surfaces engaging outer surfaces of the intermediate member, said intermediate member being formed of self-lubricating material.

7. A coupling connection comprising a member having a plurality of longitudinally extending, relatively thin cylindrical walls, an intermediate member having a plurality of inner cylindrical surfaces overlapping and engaging the outer surfaces of said cylindrical walls, a third member having a plurality of cylindrical surfaces engaging outer surfaces of the intermediate member, and resiliently actuated means for forcing said thin walls into sealing engagement with the surfaces engaged thereby.

8. A swivel coupling connection comprising a pair of relatively rotatable coupling members, each member having a plurality of cylindrical surfaces overlapping and in sealing engagement with corresponding cylindrical surfaces of the other member, the outside diameter of the inner cylindrical surfaces slightly exceeding the inside diameter of the outer cylindrical surfaces, and resiliently actuated means for forcing the inner surface into closed contact with the outer surface.

9. A coupling connection for interconnecting sections of a pipe line carrying fluid under pressure comprising a thick walled rigid member having a cylindrical bore therein, a second member having a thin walled resilient cylindrical sleeve in tight engagement with said bore and rotatable therein, the fluid in said pipe line exerting a pressure on the inside of said sleeve to maintain said tight engagement.

10. A coupling connection for interconnecting sections of a pipe line carrying fluid under pressure comprising a thick walled rigid member having a cylindrical bore therein, a second member having a thin walled resilient cylindrical sleeve in tight engagement with said bore and rotatable therein, the outside diameter of said sleeve slightly exceeding the diameter of the bore, the fluid in said pipe line exerting a pressure on the inside of said sleeve to maintain said tight engagement.

11. A coupling connection for interconnecting sections of a pipe line carrying fluid under pressure comprising a thick walled rigid member having a plurality of cylindrical bores therein, a second member having a plurality of thin walled resilient cylindrical sleeves in tight engagement with said bores and rotatable therein, the fluid in said pipe line exerting a pressure on the inside of said sleeves to maintain said tight engagement.

12. A coupling connection for interconnecting sections of a pipe line carrying fluid under pressure comprising a thick walled rigid member having a plurality of cylindrical bores therein, a second member having a plurality of thin walled resilient cylindrical sleeves in tight engagement with said bores and rotatable therein, the outside diameter of said sleeves slightly exceeding the diameter of the bores, the fluid in said pipe line exerting a pressure on the inside of said sleeves to maintain said tight engagement.

STEPHEN GUARNASCHELLI.